US012687456B2

(12) United States Patent (10) Patent No.: US 12,687,456 B2
Legros et al. (45) Date of Patent: Jul. 21, 2026

(54) METHOD AND SYSTEM FOR CHARACTERIZING AN OPTICAL LENS FOR CORRECTING OPTICAL ABERRATIONS INTRODUCED BY SAID OPTICAL LENS IN AN IMAGE

(71) Applicant: FOGALE NANOTECH, Nîmes (FR)

(72) Inventors: Eric Legros, Nîmes (FR); Sylvain Petitgrand, Caissargues (FR)

(73) Assignee: FOGALE NANOTECH, Nimes (FR)

( * ) Notice: Subject to any disclaimer, the term of this patent is extended or adjusted under 35 U.S.C. 154(b) by 127 days.

(21) Appl. No.: 18/850,442

(22) PCT Filed: Mar. 31, 2023

(86) PCT No.: PCT/EP2023/058491
§ 371 (c)(1),
(2) Date: Sep. 24, 2024

(87) PCT Pub. No.: WO2023/187171
PCT Pub. Date: Oct. 5, 2023

(65) Prior Publication Data
US 2025/0271327 A1 Aug. 28, 2025

(30) Foreign Application Priority Data
Apr. 1, 2022 (FR) ...................................... 2202990

(51) Int. Cl.
*G01M 11/02* (2006.01)
(52) U.S. Cl.
CPC .... *G01M 11/0242* (2013.01); *G01M 11/0292* (2013.01)
(58) Field of Classification Search
CPC ...................... G01M 11/0242; G01M 11/0292
See application file for complete search history.

(56) References Cited

U.S. PATENT DOCUMENTS

2021/0088327 A1 3/2021 Tao et al.
2021/0116705 A1 4/2021 Kang et al.

FOREIGN PATENT DOCUMENTS

DE 11 2015 002718 T5 3/2017
WO 2020/245511 A1 12/2020
WO WO-2022209056 A1 * 10/2022 ............. G06N 20/00

OTHER PUBLICATIONS

International Search Report and Written Opinion received for PCT/EP2023/058491, mailed Jul. 3, 2023.
(Continued)

*Primary Examiner* — Tony Ko
(74) *Attorney, Agent, or Firm* — Greer, Burns & Crain, Ltd

(57) ABSTRACT

A method for characterizing an optical lens that includes a stack of several optical elements and is intended to be associated with an image sensor for acquiring images, the method including
  determining, by optical measurement on the stack of optical elements, at least one data set (JG), referred to as geometric set, including data relating to at least one geometric parameter of at least one buried optical interface of the lens,
  digitally modeling the optical lens according to the geometric set, and
  determining, by an optical wave propagation digital simulator applied to the digital model, at least one matrix, referred to as aberration matrix, representative of optical aberrations introduced by the optical lens in an image.
Also disclosed is a characterization device, an image acquisition method and device, and an imaging apparatus implementing such a method.

15 Claims, 5 Drawing Sheets

(56)            References Cited

OTHER PUBLICATIONS

French Search Report received for Application No. 2202990, dated
Dec. 2, 2022.

* cited by examiner

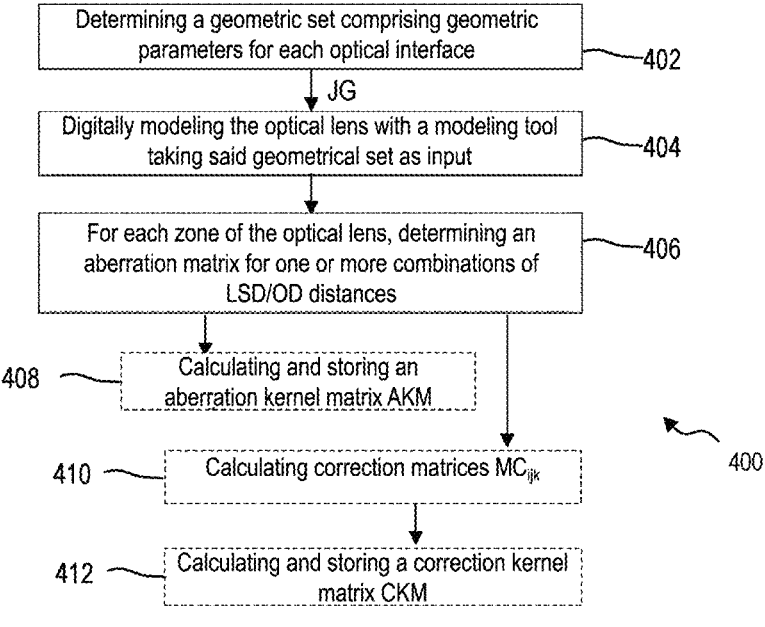
FIG. 4
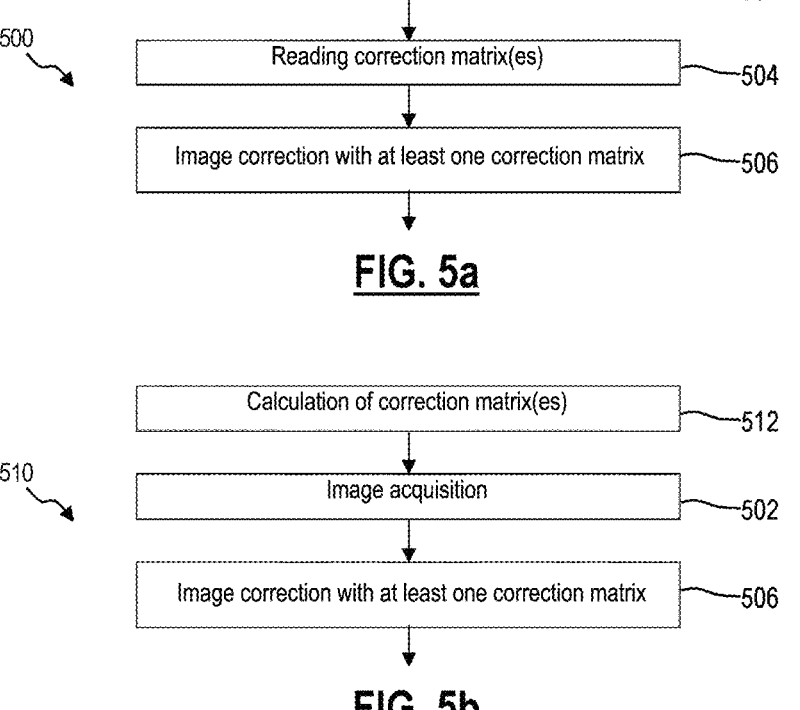
FIG. 5a
FIG. 5b

METHOD AND SYSTEM FOR CHARACTERIZING AN OPTICAL LENS FOR CORRECTING OPTICAL ABERRATIONS INTRODUCED BY SAID OPTICAL LENS IN AN IMAGE

BACKGROUND

The present invention concerns a method for characterizing an optical lens to determine a matrix of values for correcting at least some optical aberrations introduced by said lens in an image produced with said lens. It also concerns a characterization device, an image acquisition method and device, and an imaging apparatus implementing such a method.

The field of the invention is the field of characterization of optical lenses used for imaging, with a view to correcting optical aberrations caused by said optical lens.

Optical lenses are used in a variety of apparatuses, such as still and video cameras, smartphones, etc., to capture an image of a scene.

Typically, an optical lens consists of a stack of optical elements, such as optical lenses, separated by an air gap or spacer. They are generally assembled via a device known as a barrel.

To produce an image, the optical lens cooperates with a photosensitive sensor, also known as an image sensor, such as a CMOS or CCD sensor. The plane of the image sensor is called the image plane, and each image sensor comprises a multitude of pixels. The assembly comprising the optical lens and the image sensor is generally referred to as an "optical module" or "camera module".

The trend towards miniaturization of camera modules used in electronic devices such as smartphones is reducing component manufacturing tolerances, particularly those of the optical lens and the lenses composing said optical lense. Manufacturing defects can thus appear in the form of image defects on the image sensor. For example, optical aberrations can result in blurred images. The brightness of a pixel in an original image is distorted, modifying the brightness of an adjacent pixel in the captured image. This phenomenon can be expressed as a Point Spread Function (PSF) indicating a degree of blur obtained during a process wherein an optical system forms an image of a scene on an image sensor. The PSF can then be used to deduce correction values, in an image, for optical aberrations caused by the optical lens, for example by deconvolution.

The first known solution is to measure the PSF for each optical lens manufactured: this solution is time-consuming. In a second solution, the PSF can be measured for an optical lens and reused for all optical lenses in the same batch: this solution, although less time-consuming, is imprecise because it doesn't take into account the specifics of each optical lens.

According to a third known solution, the PSF can be estimated by calculation, for each optical lens, from the individual parameters of each optical element forming said optical lens. However, the inventors of the present invention have discovered that this solution, although less time-consuming, is also imprecise, as it does not take into account manufacturing parameters, and in particular those that may influence interactions between the optical elements of an optical lens, as well as micro-defects in the construction of the optical elements.

One aim of the present invention is to solve at least one of the above-mentioned shortcomings.

Another aim of the invention is to offer a solution that provides better correction of optical aberrations introduced by an optical lens, while being less time-consuming.

SUMMARY

The invention proposes to achieve at least one of the aforementioned goals by a method for characterizing an optical lens comprising a stack of several optical elements and intended to be associated with an image sensor for acquiring images, said method comprising the following steps:

determining, by optical measurement on said stack of optical elements, at least one data set, called geometric set, comprising data relating to at least one geometric parameter of at least one buried optical interface of said lens, digitally modeling said optical lens based on the geometric set, and determining, by an optical wave propagation digital simulator applied to said digital model, at least one matrix, called aberration matrix, representative of optical aberrations introduced by said optical lens into an image.

Thus, the invention proposes to determine an aberration matrix whose values are representative of optical aberrations introduced by the optical lens on an image taken by said optical lens, through simulation on a digital model of said optical lens and not by optical measurements performed on said optical lens. In this way, the invention makes it possible to determine the aberration matrix in a less time-consuming way than current solutions, which measure these aberrations, and in particular the PSF, on each optical lens.

In addition, the invention proposes to determine the aberration matrix through simulation on a digital model of the optical lens. In this way, the aberration matrix can be determined individually for each optical lens, making it possible to obtain aberration values, and therefore correction values, individually for each optical lens, so as to achieve more precise correction.

Above all, the invention makes it possible to determine the digital model of the optical lens as a function of the parameters of the optical interfaces of said optical lens, measured after the optical elements forming the lens have been stacked. In this way, the digital model of the optical lens takes into account the characteristics of each optical element in combination with the other optical elements of the optical lens. A digital model of this kind is more accurate and closer to reality, providing more precise representative values of optical aberrations, and therefore enabling better correction of optical aberrations introduced into an image by said optical lens.

"Optical aberration" refers in particular to optical blurring or distortion. Optical blurring generally means the spreading of a point of light. Distortion generally means a shift in the optical point.

The optical elements making up an optical lens are stacked along a stacking direction, also hereafter referred to as the Z axis, or the optical lens axis. The plane perpendicular to the Z axis, i.e. the plane along which each optical element extends, is hereafter referred to as the X-Y plane.

By "geometric parameter of an optical interface", we mean, for example, and without loss of generality:

a position of the optical interface within the lens, in the Z axis;

a position of an APEX of the optical interface, in particular in the X-Y plane and/or a position of an APEX of the optical interface, in particular along the Z axis, an inclination (TIP and/or TILT) of said optical interface with respect to the Z axis, a decentration of an optical interface, or an optical element, from the Z axis in the X-Y plane, a curvature or term(s) of an equation describing an optical interface.

In the present application, "buried optical interface" of an optical lens means an interface within the optical lens that is only visible, or accessible, via at least one other optical interface of the lens. The at least one other optical interface through which the buried interface is visible may be an optical interface of the same optical element, or an optical interface of an optical element other than the buried interface.

The geometric set comprises data relating to at least one geometric parameter of at least one buried interface of said stack.

The geometric set may further comprise data relating to at least one geometric parameter of at least one non-buried interface of said stack.

According to embodiments, the method according to the invention may comprise a determination of a plurality of aberration matrices for a plurality of regions, $R_i$, of the image sensor associated with the optical lens.

In this way, it is possible to characterize more precisely the optical aberrations introduced by the optical lens in any given region of the image sensor, since these aberrations can change depending on the region of the image sensor. For example, the optical aberrations introduced in a central region are often different from those in a peripheral region. Similarly, optical aberrations in one peripheral region are likely to differ from optical aberrations introduced in another peripheral region.

Each aberration matrix can be determined by simulation using the digital simulator.

To do this, a test light beam is emitted for each region in the digital simulator. The test beam enters the optical lens, passes through the optical lens and is received on an image sensor. The values received are compared with the input values, i.e. the values of the test light beam. This comparison makes it possible to deduce the aberrations introduced by the optical lens by examining each pixel in the region in question and comparing it with the emitted beam.

In particular, aberrations can be determined by performing convolution on a matrix of values describing them with the intensities of light points in a region of an observed scene, thereby obtaining the intensity values received at the image sensor in the corresponding region.

"Region" means a region of the image sensor in its X-Y plane.

At least one region may comprise a single pixel.

At least one region may comprise several pixels.

At least two regions can be the same size.

At least two regions can be of different sizes.

In the present document, a region of the image sensor centered on the coordinates $(X_i, Y_i)$, in the (X,Y) plane, can be referred to as $R (X_i, Y_i)$, or $R_i$.

In this document, MA refers to the aberration matrix for the entire optical lens.

$MA_i$, or $MA_i(X_i, Y_i)$ designates the aberration matrix for the region $R_i$ of the lens. The aberration matrix MA can be obtained by concatenating or adding the aberration matrices $MA_i$.

According to embodiments, the method according to the invention may comprise, for a region of the image sensor, calculating an aberration matrix by interpolating one or more aberration matrices of one or more other regions of said optical lens.

In this way, the method according to the invention enables the optical lens to be characterized in less time.

In particular, the aberration matrix of a region can be calculated by interpolating aberration matrices of adjacent regions.

The interpolation can be performed using any known technique, such as averaging.

Alternatively, or additionally, the method according to the invention can comprise determining a plurality of aberration matrices for a plurality of values of a distance, called lens-to-sensor distance, hereinafter abbreviated LSD, between said optical lens and an image plane, the digital simulator taking said lens-to-sensor distance as input.

In this way, the method according to the invention makes it possible to quantify the optical aberrations introduced by the optical lens into an image, when the distance between the optical lens and the image plane is changing. Indeed, the inventors have noticed that, for a given lens, the optical aberrations introduced by said lens can vary as a function of the distance between said lens and the image plane.

The image plane can be the plane of an image sensor associated with the lens. The image sensor can be any type of sensor, such as a CMOS or CCD sensor, etc.

To do this, for each distance $LSD_j$, where $j \geq 1$, a test light beam is emitted facing the lens. The test beam enters the optical lens, passes through the optical lens and is received on an image sensor. The aberration matrix is determined as a function of the received values and the input values, i.e. the values of the test light beam.

Several aberration matrices can be determined for different distances $LSD_j$, for the entire optical lens.

Alternatively, several aberration matrices can be determined for a plurality of $LSD_j$ distances, for different regions of the image sensor.

Alternatively, or additionally, the method according to the invention can comprise determining a plurality of aberration matrices for a plurality of values of a distance, called the object distance, OD, between said optical lens and a scene, the digital simulator taking said object distance as input.

In this way, the method according to the invention makes it possible to quantify the optical aberrations introduced by the optical lens into an image, when the distance between the optical lens and the image scene is changing. Indeed, the inventors have noticed that, for a given lens, the optical aberrations introduced by said lens can vary as a function of the distance between said lens and the scene.

To do this, for each distance $OD_k$, where $k \geq 1$, a simulated test light beam is emitted facing the lens. The test beam enters the optical lens, passes through the optical lens and is received on an image sensor. The aberration matrix is determined as a function of the received values and the input values, i.e. the values of the test light beam.

Several aberration matrices can be determined for different distances $OD_k$, for the entire optical lens.

Alternatively, several aberration matrices can be determined for a plurality of $OD_k$ distances, for different regions of the image sensor.

Thus, according to some embodiments, it is possible to determine a number $NB = I \times J \times K$ of aberration matrices for the optical lens, where:

$I \geq 1$ the number of image sensor regions under consideration, $J \geq 1$ the number of LSD distances under consideration, and

K≥1 the number of OD distances under consideration.

For example, if ten (10) image sensor regions are characterized for three LSD$_j$ distances and five OD$_k$ distances, then 15 aberration matrices can be determined for each image sensor region, and a total of 150 aberration matrices for the optical lens.

In the following, for the sensor region R$_i$, the distance LSD$_j$ and the distance OD$_k$:

MA$_{ijk}$ designates the aberration matrix, and

MC$_{ijk}$ designates the correction matrix.

Of course, if the LSD distance and/or the OD distance are not variable, then the notations MA$_{ijk}$ and MC$_{ijk}$ do not necessarily imply that these distances are variable.

According to embodiments, the method according to the invention may also comprise a step for calculating a matrix, called aberration kernel matrix, comprising coefficients enabling at least one aberration matrix to be deduced.

In this case, a plurality of aberration matrices can be determined. Then, from these matrices, a common matrix can be identified. This common matrix, called aberration kernel matrix, can be stored instead of the multitude of aberration matrices, in relation to one or more relationships, to enable the calculation of each aberration matrix. This avoids the need to store a multitude of aberration matrices, and therefore reduces the memory space used for storing aberration matrices.

The kernel aberration matrix can, by no means restrictively, be determined as follows.

As a first step, we establish a basis of FA functions to describe the values of the coefficients of the aberration matrices as a function of the positions (X,Y) in the image sensor field, such as:

$$MA(X, Y) = \sum_I \alpha A_I(X, Y)FA_I(X, Y) + E(X, Y)$$

where

I scans the function basis FA, where 1≤I≤L, and L≥1.

the term E(X, Y) models the differences between the combination of the FA$_I$ and MA functions.

The base FA can preferably be chosen to be sufficiently broad for the term E(X,Y) to have a negligible or even zero effect. These functions can be orthogonal to each other in the sense of a scalar product, but not necessarily. For example, the function basis FA$_I$ can be the function basis of Zernike polynomials. To obtain the functions αA$_I$(X,Y), it is sufficient to use a method known in the art such as a projection of MA(X, Y) onto FA$_I$(X, Y), in the sense of a scalar product, and to apply the appropriate matrix product to take account of their non-orthogonality, if necessary, to obtain the functions αA$_I$(X, Y). Establishing an kernel aberration precursor (KAP) comes down to finding a parametric model of the functions αA$_I$(X,Y), such that for example a polynomial expression represents αA$_I$(X, Y), for example, if I∈{1, 2}, such that αA$_1$(X, Y)=a$_{01}$·((X−x$_{01}$)$^2$+(Y−y$_{01}$)$^2$) and αA$_2$(X, Y)=a$_{02}$·((X−x$_{02}$)*(Y−y$_{02}$))+z$_{02}$. The model representing αA$_I$(X,Y), ici αA$_1$(X,Y) and αA$_2$(X,Y), is then the table of values ((a$_{01}$, x$_{01}$, y$_{01}$); (a$_{02}$, x$_{02}$, y$_{02}$, z$_{02}$)) in this example. We can call this set of coefficients the kernel aberration precursor, or KAP, matrix (here, this can be a matrix of 1 row×7 columns, or 2 rows by 4 columns with a zero coefficient added to the 1st row). As the functions FA$_I$( ) are chosen to best model the modes of the aberrations obtained, the parametric model representing the αAI(X, Y) functions depending on the geometric parameters contains significantly fewer coefficients than the numerical representation of the FA$_I$(X, Y) functions. Here, for example, it contains 8 coefficients instead of the 16 million coefficients that would have been needed to represent the aberration functions represented by 4×4 coefficients on an X, Y field of 1000× 1000 positions. A final step in obtaining the aberration matrix is to represent the evolution of KAP coefficients as a function of the parameters that are the lens-to-sensor distance and object distance LSD and OD, which once again involves a set of several parameters in functions modeling KAP values depending on LSD and OD. It is this last set of coefficients that can advantageously constitute the kernel aberration matrix.

In another example, the kernel aberration matrix can be a table of matrices containing KAP coefficients, or directly the KAP for several sets of LSD and OD parameters. The key is to be able to retrieve the lens aberration matrices from the geometric parameters, preferably by storing less data than the aberration matrices represent.

For example, the function basis FA$_I$ can be the function basis of Zernike polynomials.

According to embodiments, the method according to the invention may further comprise a step of calculating, as a function of at least one aberration matrix, at least one matrix, called correction matrix, comprising values for correcting an image captured with said optical lens.

In particular, a correction matrix can be calculated for each aberration matrix.

For at least one aberration matrix, the correction matrix can be obtained by inverting said matrix, which can be done, for example, through calculations in the spatial frequency domain.

According to exemplary embodiments, at least one correction matrix can be obtained by the relationship:

$$MC_{ijk} = TF^{-1}\left\{\frac{TF\{G_0\}}{TF\{MA_{ijk}\}}\right\}$$

where G$_0$ is a function representing the form of the point dispersion function to be obtained after correction. It can be a function approaching a Dirac function in two dimensions, i.e. 1 at the center, and almost 0 around it. Using MTOBS$_{ijk}$ to refer to the matrix of the test light beam as observed, and MT its native form as it actually is when emitted, the correction matrix MC$_{ijk}$ may be as follows:

$$MC_{ijk} = TF^{-1}\left\{\frac{TF\{G_0\}\cdot TF\{MT_{ijk}\}}{TF\{MTOBS_{ijk}\}}\right\}$$

In simplified form, we can assume that TF(G0)=1, the constant function that returns 1 with zero phase at all frequencies, which leads to:

$$MC_{ijk} = TF^{-1}\left\{\frac{TF\{MT_{ijk}\}}{TF\{MTOBS_{ijk}\}}\right\}$$

where:

TF( ) is the Fourier transform operator (in 2D)

TF$^{-1}$( ) is the inverse Fourier transform operator (in 2D)

MC$_{ijk}$ is the correction matrix for the R$_i$ region of the image sensor, at lens-to-sensor distance LSD$_j$ and object distance OD$_k$;

$MA_{ijk}$ is the aberration matrix obtained by simulation for the region $R_i$ of the optical lens and the distances $LSD_j$ and $OD_k$;

$MT_{ijk}$ is the test light beam matrix, i.e. the matrix describing the test light beam, used to measure the aberration matrix $MA_{ijk}$ by simulation; and $MTOBS_{ijk}$ is the observed illumination matrix, obtained by simulation, in the sensor plane with respect to the test matrix $MT_{ijk}$ presented at the lens input.

According to some embodiments, like the aberration kernel matrix calculated for the aberration matrices, the method according to the invention can also include a step for calculating a matrix, called correction kernel matrix, comprising coefficients for deriving at least one correction matrix.

In this case, a plurality of correction matrices can be determined. Then, from these correction matrices, a common correction matrix, denoted MC, can be identified, for example by adding or concatenating the correction matrices $MC_{ijk}$. This common correction matrix can be stored instead of the multitude of correction matrices, in association with one or more relations, to enable the calculation of each correction matrix. This avoids having to memorize a multitude of correction matrices.

The correction kernel matrix can be determined in a similar way to that described above for the aberration kernel matrix, using the same function basis $FA_I$, or another suitable function basis.

In preferred embodiments, at least one aberration matrix can be what is referred to as a PSF matrix of Point Spread Function (PSF) values.

Alternatively, or in addition, at least one aberration matrix can be an OTF matrix of Optical Transfer Function values.

In yet another alternative, or in addition, at least one aberration matrix can be a matrix of values obtained by wavefront analysis.

When an aberration matrix is a PSF matrix, then the correction matrix calculated for said aberration matrix can be a matrix of values, called IPSF matrix, obtained by inverting said PSF matrix.

The digital simulator can be any type of simulator for optical wave propagation through multiple optical interfaces and elements.

Such digital simulators are familiar to the person skilled in the art and are widely available on the market.

For example, the digital simulator could be the OpticStudio simulator from Zemax. Of course, the invention is not limited to this simulator, and any type of digital simulator of light beam propagation can be used.

In some embodiments, at least one geometric set can be obtained by optical interferometry.

Alternatively, or in addition, at least one geometric set can be obtained by confocal measurement(s).

The geometric set can be determined from optical measurements made only from one face, or side, of the stack of optical elements, without having to turn the stack upside down.

According to embodiments, at least one geometric set can be determined by confocal measurements performed on the stack of optical elements of the target optical lens, preferably from one face of said stack.

Conventionally, a confocal measurement is performed with a device that includes a first aperture (orifice) imaged onto the surface to be measured via a focusing lens. This aperture is illuminated by a beam of light from a light source, which is then directed onto the surface to be measured. When the beam is reflected by a surface, it is redirected to the focusing lens and then to a second lens positioned in front of a detection element so as to be the conjugate image of the illuminated point on the measured surface. The advantage of such a configuration is that it reduces the depth of field, making it easier to distinguish objects (or surfaces) from one another. For detection, the confocal measurement system is moved relative to the object being measured. A maximum intensity is detected on the sensing element when a surface enters the focus point defined by the focusing lens. One particular configuration of a confocal measurement system uses a chromatic lens to focus and image a beam from a polychromatic source. The different wavelengths thus define different focal points along the optical axis of the lens. By detecting the reflected light with a spectrometer, we can identify the wavelength reflected and deduce the height (or distance) between the lens and the surface being measured. This configuration eliminates or reduces the displacement of the confocal measurement system. In particular, when the confocal measurement system is moved in a plane perpendicular to the illumination axis of the surface to be measured, surface topography information can be obtained.

According to embodiments, at least one geometric set can be determined by optical interferometry measurements performed on the stack of optical elements of the target optical lens, preferably from one face of said stack.

Conventionally, an optical interferometry measurement is performed with an optical interferometry device comprising a low-coherence emitting light source. This light source emits a beam of light, called measuring beam, in the direction of the stack of optical elements, particularly along the Z axis. The measuring beam illuminates the stack of optical elements at a measurement point that is wider or narrower depending on the focus in the X-Y plane, and then traverses the stack of optical elements, in particular in the stacking direction, and passes through each optical interface in turn. At each optical interface, part of the beam is reflected, forming a reflected beam. This reflected beam is then picked up by a sensor on the same side as the emission source, and characterized by optical interferometry with a reference beam also coming from the light source. The term "coherence zone" refers to the area wherein interference between the measuring beam and the reference beam can occur on the sensor. The coherence zone can be shifted by varying the difference in optical path length between the two beams, for example by changing the optical length of one or both beams. The optical interferometer can selectively detect an interference signal for each interface at which the coherence zone is positioned, i.e. for each surface within the coherence zone. Preferably, the coherence length of the light source is adjusted so as to be shorter than a minimum optical distance between two adjacent interfaces of the optical element. Thus, for each measurement, only one interface is in the coherence zone, and so an acquired interference signal comprises the contribution of only one interface, or comes from only one interface. Interference measurements are carried out according to a field of view determined by the interferometric device's measuring means.

In one embodiment, the interferometric device can operate in point mode by being configured to detect a point interference signal at one point in the field of view or at a point detector. The resulting interference signal, or interferogram, is a signal whose intensity depends on the displacement of the coherence zone along the Z axis. The interference signal can, for example, be seen as a succession of interference lines associated with each optical interface.

Alternatively or additionally, the interferometric device may comprise an interferometric sensor, called a full-field interferometric sensor, configured to detect a full-field interference signal in a field of view and represented, for example, as a 2D image (interference image) by means of the detection element.

An interface to be measured can thus be imaged according to the field of view in a single measurement or by scanning beam.

In a particular implementation example, a measurement signal can be formed by a point interference signal associated with a pixel of the detection element, the intensity of which is detected according to the Z-axis displacement of the coherence zone.

According to one example, the interferometric apparatus can comprise an interferometric sensor with a Michelson interferometer. According to another example, the interferometric apparatus can comprise an interferometric sensor with a Mach-Zehnder interferometer.

In one embodiment, a point-mode interferometer and a full-field interferometer can be combined.

According to embodiments, at least one geometric set may comprise a value of at least one geometric parameter of an optical interface of the target lens.

For example, the geometric set may comprise, for at least one, and in particular each, optical interface, of the stack:

at least one optical interface position value;

at least one decentration value of the optical interface relative to the Z axis, or relative to a center position of another interface, in the X-Y plane; or at least one optical interface inclination value relative to the Z axis, or relative to the inclination of another interface.

at least one value for the topography or shape profile of the optical interface, for example relative to a reference plane or axis, in order to deduce, for example, values for decentration or inclination, or values for the shape of the interface.

The Z-axis position of an optical interface can be determined as the position of an interference line corresponding to said interface.

The thickness of an optical element, along the Z axis, can be determined by calculating the distance between the interference lines corresponding to each of the optical interfaces of said optical element.

The position of an optical interface relative to the Z axis can be determined by performing several optical interferometric measurements, in particular in a central region of the image sensor. By monitoring the Z-axis position of the interference line associated with said interface over the course of several measurements, it is possible to determine the position of the APEX of said optical interface. The position of the optical interface's APEX is used to determine its position relative to the Z axis, in the X-Y plane, and therefore its decentration from the Z axis.

In another example, the position of an interface relative to the Z axis can be obtained, for example, by detecting an interference image of the interface in a central region of the image sensor and analyzing this image and/or analyzing associated amplitude or phase images, in particular to obtain a profile of this surface and the position of the APEX of said optical interface.

The position of an optical element relative to the Z axis can be determined by the positions of its optical interfaces.

The inclination of an optical interface relative to the Z axis can be determined by performing several optical interferometric measurements, in particular in a peripheral region of the image sensor. By monitoring the Z-axis position of the interference line associated with said optical interface over the course of several measurements, it is possible to determine the position of the interface along the axis at its edges, thus enabling the inclination of said interface relative to the Z-axis to be determined.

The inclination of an optical element relative to the Z axis can be determined by the inclinations of its optical interfaces.

It is also possible to determine each of these geometric parameters using the amplitude of an interference line, in addition to or instead of the position of the interference line.

As mentioned above, the aberration matrix can be obtained around each pixel of the sensor. In this case, the lens is illuminated by a test light beam, then the illumination received at the image sensor is measured. This illumination received by the sensor comprises information on the optical aberrations introduced by the optical lens in each image captured.

The aberration matrix can be obtained by image sensor region, each corresponding to several pixels on the image sensor. In this case, an illumination pattern is presented in front of the lens, such as a checkerboard pattern alternating white and black patterns, and the illumination received at the sensor is measured. This illumination received by the sensor comprises information on the optical aberrations introduced by the optical lens in each image captured.

A transformation of the captured images may be necessary in order to obtain, for example, the point spread function (PSF) which would correspond to, for example, a test beam originating from a single point of light illuminating the lens, moved into several regions of the field visible through the lens in order to obtain the PSFs for several regions of the sensor. But if the simulation allows the lens to be illuminated from a single movable point, these transformations can generally be omitted to obtain PSFs directly.

According to another aspect of the present invention, there is proposed a system for characterizing an optical lens comprising a stack of several optical elements and intended to be associated with an image sensor (704) for acquiring images, said system comprising:

a device for optically measuring, on said stack of optical elements, at least one data set, referred to as geometric set, comprising data relating to at least one geometric parameter of at least one buried optical interface of said lens;

at least one calculation unit configured for:

digitally modeling said optical lens based on the geometric set, and determining, by an optical wave propagation digital simulation applied to said digital model, at least one matrix, called aberration matrix, representative of optical aberrations introduced by said optical lens into an image.

In general, the system according to the invention may comprise means configured to implement any combination of at least one of the features described above in reference to the characterization method according to the invention, and which are not repeated here in detail for the sake of conciseness.

The optical measurement device can be a device comprising at least one optical interferometer, and/or at least one confocal measurement device.

The computing unit can be any type of physical or virtual machine, such as at least one server, at least one computer, at least one tablet, at least one processor, at least one computer chip, at least one calculator, etc.

In particular, the computing unit can be configured to run an optical wave propagation digital simulator, such as Optic-Studio from Zemax.

According to another aspect of the present invention, a method of acquiring an image with an apparatus comprising an optical lens and an image sensor is proposed, said method comprising the following steps:

capturing an image with said optical lens and said image sensor; and correcting said image as a function of at least one correction matrix calculated from at least one aberration matrix obtained, for said optical lens, by the method according to the invention for characterizing an optical lens.

In some embodiments, at least one correction matrix can be calculated outside the image acquisition apparatus.

In this case, said correction matrix can be calculated before the optical lens is integrated into the device, and in particular at the time of, during or after, the design of the optical lens.

The at least one correction matrix can be calculated by a characterization method or system according to the invention.

In this case, the at least one previously calculated correction matrix is loaded and stored in the apparatus.

In some embodiments, at least one correction matrix can be calculated within the image acquisition apparatus.

In this case, the correction matrix can be calculated from:

at least one aberration matrix, an aberration kernel matrix, or a correction kernel matrix.

In this case, it is not necessary to calculate all the correction matrices prior to integrating the optical lens into the apparatus, and the correction matrices are calculated within the apparatus, in the environment wherein the optical lens is used. This makes it possible to take into account specific features arising from, or dependent on, the conditions under which the optical lens is integrated into the apparatus, resulting in greater precision.

At least one correction matrix can be calculated once and then stored in the apparatus for repeated use.

For example, at least one correction matrix can be calculated just after integration of the optical lens into the apparatus, or at the time of apparatus configuration, or at the time of installation/configuration of an image acquisition application, and stored in the apparatus for use over time.

At least one correction matrix can be calculated, or recalculated, on the fly each time an image is acquired, or each time an image acquisition application is started.

In this case, it is not necessary to store at least one correction matrix, which is calculated on the fly.

This embodiment bypasses the need to store all the correction matrices and calculate the at least one correction matrix when it is used.

For example, when an image is acquired, the distances LSD and OD can be determined and the at least one correction matrix corresponding to said distances can be determined on the fly.

The method according to the invention can also include a step for determining a distance, LSD, between the optical lens and an image plane, the correction taking into account said LSD distance.

The LSD distance can, for example, be measured by a distance sensor, such as an optical sensor, a magnetic sensor, a capacitive sensor, etc.

The LSD distance can, for example, be calculated from information provided by a focus adjustment mechanism modifying or controlling the distance between the lens and the image sensor.

The method according to the invention can also include a step for determining a distance, OD, between the optical lens and the scene, the correction taking into account said OD distance.

The OD distance can, for example, be measured by LIDAR, a time-of-flight camera, an ultrasonic sensor, textured image analysis and so on.

A single OD distance can be measured for the optical lens. Alternatively, OD distances can be measured for different regions of the image sensor.

According to another aspect of the present invention, an image acquisition device is proposed, comprising:

an optical lens comprising a stack of several optical elements, an image sensor, and a calculation unit;

configured to implement the image acquisition method according to the invention.

According to embodiments, but by no means in a restrictive manner, the device according to the invention can be a camera module integrated, or designed to be integrated, into a device, such as a camera, a tablet, a smartphone, a computer, a surveillance camera, etc.

In general, the image acquisition system according to the invention may comprise means configured to implement any combination of at least one of the features described above in reference to the image acquisition method according to the invention, and which are not repeated here in detail for the sake of conciseness.

The image acquisition device may optionally comprise at least one sensor for measuring at least one OD distance for at least one region of the optical field, when acquiring the image, said at least one distance being used for correcting the image. Such a sensor may be an optical sensor, a LIDAR sensor, a time-of-flight camera, and so on.

The image acquisition device may optionally comprise at least one means for measuring, or calculating, an LSD distance during image acquisition, said distance being used for image correction. The LSD distance can, for example, be measured by a distance sensor, such as an optical sensor, a magnetic sensor, a capacitive sensor, etc. Alternatively, the LSD distance can, for example, be calculated from information provided by an optical focusing mechanism modifying the distance between the optical lens and the image sensor.

In a further aspect of the present invention, an image acquisition apparatus is provided, comprising an image acquisition device according to the invention.

According to embodiments, the apparatus according to the invention can be a camera, a tablet or a smartphone, a camera module intended to be integrated into another device, a computer, a surveillance camera, and so on.

BRIEF DESCRIPTION OF THE DRAWINGS

Other benefits and features shall become evident upon examining the detailed description of entirely non-limiting embodiments, and from the appended drawings in which:

FIG. 4 is a schematic representation of a non-limiting exemplary embodiment of a method according to the invention for characterizing an optical lens;

FIGS. 5a, 5b and 5c are schematic representations of non-limiting exemplary embodiments of an image acquisition method according to the invention;

DETAILED DESCRIPTION

It is clearly understood that the embodiments that will be described hereafter are by no means limiting. In particular, it is possible to imagine variants of the invention that comprise only a selection of the features disclosed hereinafter in isolation from the other features disclosed, if this selection of features is sufficient to confer a technical benefit or to differentiate the invention with respect to the prior art. This selection comprises at least one preferably functional feature which is free of structural details, or only has a portion of the structural details if this portion alone is sufficient to confer a technical benefit or to differentiate the invention with respect to the prior art.

In particular, all of the described variants and embodiments can be combined with each other if there is no technical obstacle to this combination.

In the figures and in the remainder of the description, the same reference has been used for the features that are common to several figures.

Figure 1:
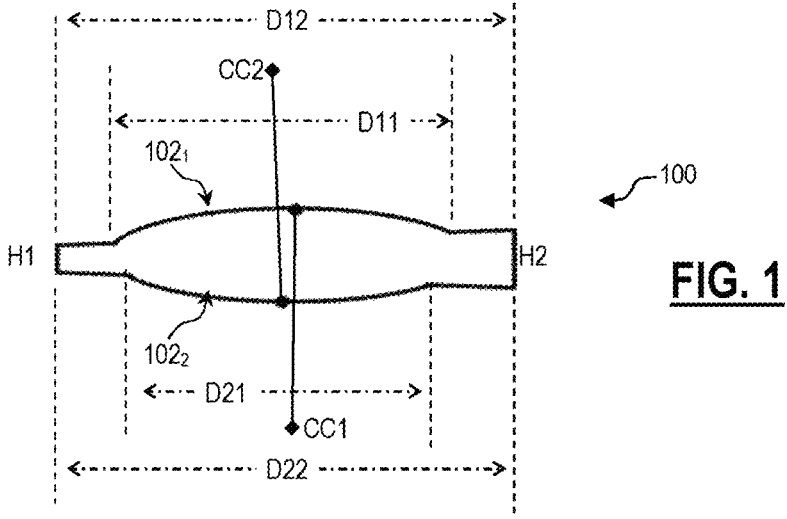
FIG. 1 is a schematic representation of a non-limiting exemplary embodiment of an optical element that can be used to manufacture an optical lens.

FIG. 1 is a schematic representation of a non-limiting exemplary embodiment of an optical element that can be used to manufacture an optical lens.

The optical element 100 of FIG. 1 can be used with at least one other optical element to manufacture an optical lens. An example of an optical lens, given as a non-limiting example, will be described with reference to FIG. 2.

The optical element 100 can be a lens element, a blade, etc. In the following, and without loss of generality, the optical element is assumed to be a lens element.

The optical lens element 100 can, for example, be manufactured by injection molding. An injection molding method generally follows the following sequence of steps:

polymer injection and mold filling, pressurization, maintaining pressure, cooling, and removal from the mold.

Injection-based lens manufacturing methods, although common, can fluctuate and generate errors in the characteristic parameters of the lens, particularly with regard to its geometry.

The lens element 100 has a given geometric shape. It has two interfaces $102_1$ and $102_2$, each with a given geometric shape. Thus, the geometric shape of lens element 100 is determined by:

a geometrical shape of each of the optical interfaces $102_1$ and $102_2$;

a center of curvature, denoted CC1 and CC2, of each of the optical interfaces $102_1$ and $102_2$;

an apex position, denoted A1 and A2, of each of the optical interfaces $102_1$ and $102_2$;

at least one thickness, denoted H1 and H2, of the lens element 100 along its periphery;

an inside diameter, denoted D11 and D21 respectively, and/or an outside diameter, denoted D12 and D22 respectively, of each of the interfaces $102_1$ and $102_2$;

a concentricity or eccentricity value for interfaces $102_1$ and $102_2$ a surface roughness of each of the optical interfaces $102_1$ and $102_2$;

etc.

The value of at least one of these geometric parameters can be supplied by the manufacturer. Alternatively, or additionally, the value of at least one geometric parameter can be measured, for example by optical or mechanical profilometry. Alternatively, or additionally, the value of at least one geometric parameter can be determined by simulation, using digital modeling of the lens element 100. Alternatively, or additionally, the value of at least one geometric parameter can be measured, for example by optical interferometry.

In addition, the lens element 100 has optical characteristics since it is an optical element. It is therefore characterized by at least one optical parameter such as:

a refraction index, denoted I1 and I2, of each of the optical interfaces $102_1$ and $102_2$;

an Abbe number, denoted Ab, etc.

Figure 2:
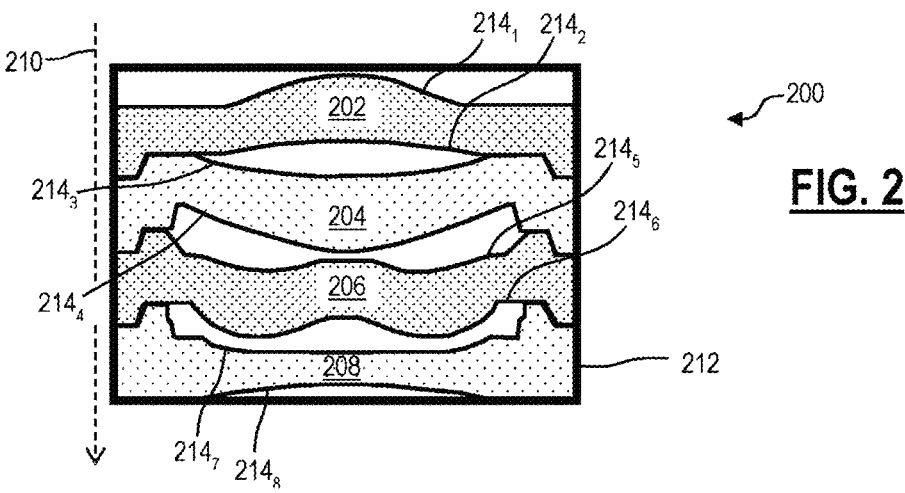
FIG. 2 is a schematic representation of a non-limiting exemplary embodiment of an optical lens that may be characterized by the present invention.

FIG. 2 is a schematic representation of a non-limiting exemplary embodiment of an optical lens that may be characterized by the present invention.

The function of an optical lens is to focus an image of a scene onto an image plane, generally constituted by a photosensitive sensor such as a CMOS sensor (known as the "CMOS Imager System", or CIS for short), or a CCD sensor. Such an optical lens is generally made up of a stack of optical elements comprising any combination of optical elements such as lenses, spacers, and opacifiers, etc.

During manufacture of the optical lens, each optical element of said lens is individually selected and stacked with the other optical elements in an assembly barrel, in a given order. The stack is then secured to the barrel using known techniques, such as gluing.

In FIG. 2, and by way of non-limiting example only, the optical lens element 200 comprises four lens elements 202-208 stacked, in a stacking direction 210, also called the Z axis, in a barrel 212. At least two of the lens elements 202-208 can be separated from each other by an air gap or spacer.

At least one of the lens elements 202-208 may, for example, be the lens element 100 shown in FIG. 1.

Each of the lens elements 202-208 has two interfaces, an upstream interface and a downstream interface, in the direction of the stack 210. Thus, lens element 202 has an upstream interface $214_1$ and a downstream interface $214_2$, lens element 204 has an upstream interface $214_3$ and a downstream interface $214_4$, lens element 206 has an upstream interface $214_5$ and a downstream interface $214_6$ and lens element 208 has an upstream interface $214_7$ and a downstream interface $214_8$.

Thus, for the optical lens 200 of FIG. 2, and in general for any optical lens comprising a stack of optical elements, it is possible to determine a set of data, called geometric set, hereinafter referred to as JG, comprising data relating to at least one geometric parameter of at least one, and in particular of each, optical interface $214_1$-$214_8$ of said stack.

Such a geometric set JG may include data relating to, or values of, any of the following geometric parameters:
- at least one position of at least one optical interface $214_1$-$214_8$ of the lens 200 along the Z-axis;
- at least one decentration value of at least one optical interface $214_1$-$214_8$ relative to the Z axis, or relative to a center position of another interface, in the X-Y plane; or
- at least one inclination value of at least one optical interface $214_1$-$214_8$ relative to the Z axis, or relative to the inclination of another interface;
- at least one topography or shape profile value of at least one optical interface $214_1$-$214_8$.

Generally speaking, the geometric set JG may comprise, for each optical interface of the optical lens, M geometric parameters with M≥1 and preferably M≥2. If the optical lens comprises N optical elements, each optical element having two interfaces, then the geometric set JG may comprise 2N×M parameters and can correspond to a matrix with 2N rows and M columns. Of course, the geometric set JG may comprise the same number of geometric parameters for at least two optical interfaces, or different numbers of geometric parameters for at least two optical interfaces.

The geometric set JG may directly comprise the values of the geometric parameters. These values can be measured by optical interferometry or confocal measurement(s), preferably from one side or face of the optical lens 200, so as to avoid rotating it.

Figure 3A:
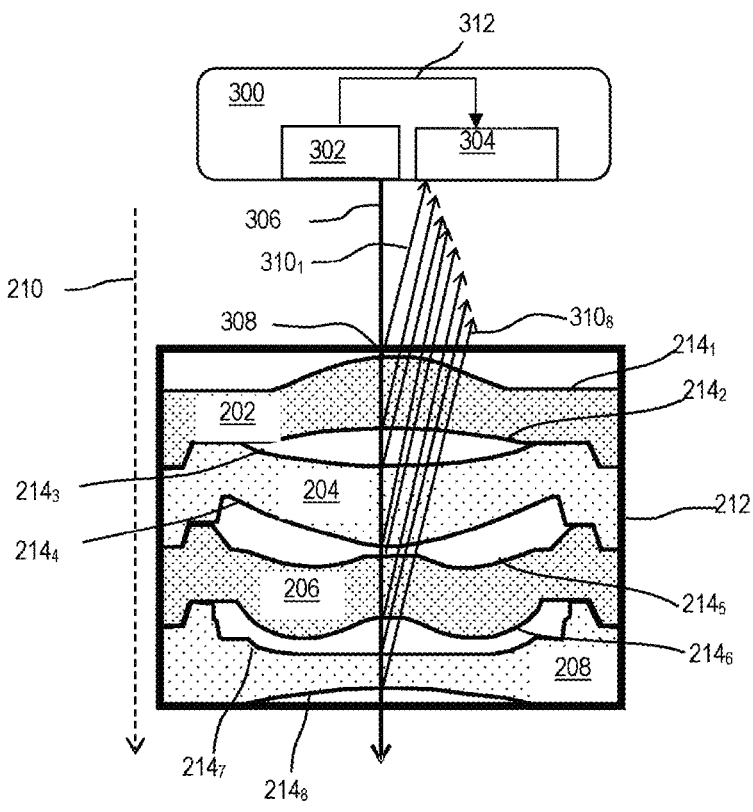
FIGS. 3a and 3b are schematic representations of a non-limiting example of an optical interferometric measurement that can be implemented in the present invention.

FIG. 3a is a schematic representation of a non-limiting exemplary embodiment of an optical interferometry measurement that can be implemented in the present invention.

The optical interferometry measurement is performed by an optical interferometer, or interferometric apparatus, 300 shown very schematically in FIG. 3a. The apparatus 300 comprises a light source 302 and an interferometric sensor 304. The source 302 emits a beam 306 of coherent light, called measuring beam, towards the stack of optical elements, at a measurement point, or field of view, 308 in the X-Y plane, perpendicular to the direction 210. The measuring beam 306 then travels through the stack of optical elements, in particular in the Z axis 210, and passes through each optical interface 214; in turn. At each optical interface $214_i$, a portion $310_i$ of the measuring beam 306 is reflected, such that:
- a beam $310_1$ is reflected by the interface $214_1$,
- . . .
- a beam $310_8$ is reflected by the interface $214_8$, Each reflected beam $310_i$ of the measuring beam 306 is then picked up by the sensor 304, which is also optically connected to the emission source 302, and will produce an interference signal when this reflected beam $310_i$ and a reference beam 312, also from the light source 302, recombine on the sensor 304, the difference in the paths traveled by the two respective beams being less than the coherence length of the emission source 302. In particular, for each reflected beam $310_i$, the sensor 304 provides an interference line, called the main line, or an interference image, depending on the illumination and detection modes implemented, at an optical distance corresponding to the position of the interface relative to the emission source 302, or any other predetermined reference. Of course, apart from the beam $310_1$ reflected by the first interface $214_1$ encountered by the measuring beam 306, part of each of the other reflected beams $310_2$-$310_8$ may, in turn, be reflected in the other direction as they pass a previous interface, thus generating multiple-reflection optical beams (not shown) picked up by the sensor 304. These multiple-reflection beams generate interference lines, called secondary lines, or secondary images, generally of lower amplitude.

Optical interferometry measurements can be carried out with a measuring beam from an interferometric sensor illuminated by a low-coherence light source. To this end, the optical interferometer has positioning means for relatively positioning a coherence zone of the interferometric sensor 304 at the interface to be measured. The interface to be measured can be a buried interface, i.e. one of the interfaces inside the optical element. To reach such a buried interface, the measurement beam must therefore pass through other interfaces in the optical lens. The interferometric device can selectively detect an interference signal for each interface at which the coherence zone is positioned, i.e. for each surface within the coherence zone, since the coherence length of the light source is adjusted to be shorter than a minimum optical distance between two adjacent optical interfaces of the optical lens. This means that, for each measurement, only one interface is in the coherence zone.

Interference measurements can be carried out according to a field of view determined by the apparatus's measuring means. Measurements can be taken either in full field or by scanning the field of view.

Digital processing means can be configured to produce, from the interference signal, the value of a geometric parameter of the interface measured according to the field of view, and in particular the values of the geometric parameters listed above with reference to FIG. 2.

Examples of interferometric apparatuses that can be used in the context of the present invention are, for example, described in document WO2020/245511 A1.

Figure 3B:
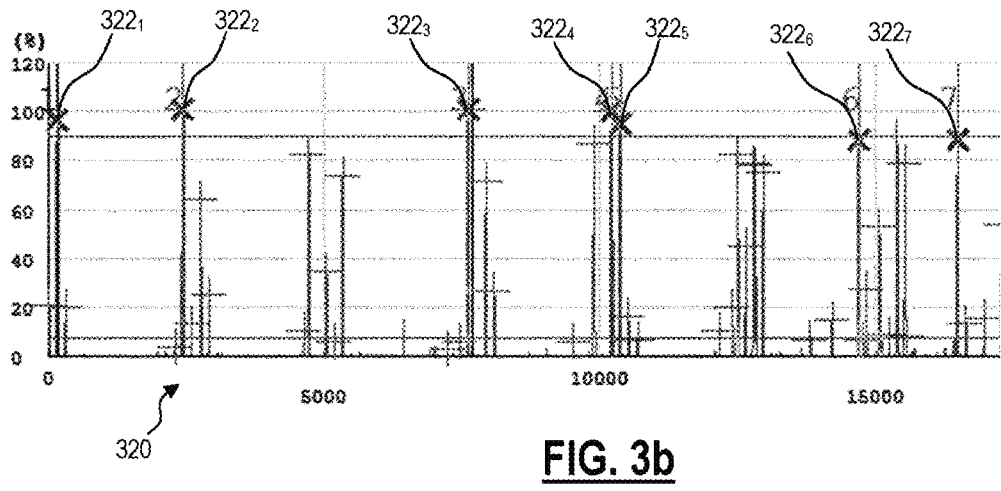

FIG. 3b shows a schematic and partial representation of raw measurement data obtained for an optical interferometry measurement, such as that described with reference to FIG. 3a.

In this exemplary embodiment, illumination along a measurement point is used, and the coherence zone is moved along the optical axis Z 210 by displacement means.

Thus, as described with reference to FIG. 3a, each interference measurement provides raw data, or an interference signal, 320. The interference signal 320 comprises main lines $322_i$, each main line corresponding to an optical interface. For example, a main line 3221 is obtained for interface $214_1$, a main line $322_2$ for interface $214_2$, etc. (interface $214_8$ does not appear in the example shown in FIG. 3b).

The interference signal 320 also includes secondary lines corresponding to multiple reflections, and associated with interfaces $214_2$-$214_8$.

The optical position of each line is given on the x-axis, and the normalized amplitude of each line is given on the y-axis.

As described above, the geometric parameters of each optical interface of the optical lens can be calculated from the interference lines. In particular:
- the Z-axis position of an optical interface can be determined as the position of an interference line corresponding to said interface.

by carrying out several optical interferometric measurements, in particular in a central zone of the optical lens, and by monitoring the Z-axis position of the interference line associated with said interface over the course of several measurements, it is possible to determine the position of the APEX of said optical interface;

the position of the APEX of an optical interface is used to determine its position relative to the Z axis, in the X-Y plane, and therefore its decentration from the Z axis;

the inclination of an optical interface relative to the Z axis can be determined by performing several optical interferometric measurements, in particular in a peripheral zone of the optical lens. By monitoring the Z-axis position of the interference line associated with said interface over the course of several measurements, it is possible to determine the position of the interface along the axis at its edges, thus enabling the inclination of said interface relative to the Z-axis to be determined.

Thus, the geometric parameters of each optical interface of the optical lens can be determined from one or more interferometric measurements made from one side of the optical lens, without having to turn the lens over.

Of course, the invention is not limited to interferometric measurements. Any type of optical measurement can be used to determine the geometric parameters of the lens' optical interfaces, such as confocal measurements.

FIG. 4 is a schematic representation of a non-limiting exemplary embodiment of a method according to the invention for characterizing an optical lens.

The method 400 of FIG. 4 can be used to characterize any type of optical lens for acquiring images, and in particular the lens 200 of FIG. 2.

The method 400 comprises a step 402 of determining, by optical measurement, geometric parameters of the lens' optical interfaces. In particular, the geometric parameters of each optical interface can be determined by optical interferometry, as described with reference to FIGS. 3a and 3b. Thus, the step 402 provides a geometric set JG comprising values of the geometric parameters of each interface of the optical lens, such as:

the Z-axis position of the optical interface, the APEX position of the optical interface, the decentration of the optical interface from the Z axis in the X-Y plane;

the inclination of the optical interface from the Z axis in the X-Y plane;

etc.

The geometric set JG thus comprises all the geometric values needed to model the optical lens in digital form.

In a step 404, the optical lens is modeled digitally, using a modeling tool.

In a step 406, one or more aberration matrices are measured using the digital model of the optical lens in an optical wave propagation simulator.

The step 406 can determine a single aberration matrix for the optical lens.

Alternatively, the step 406 can be repeated several times in different regions, denoted $R_i$, of the image sensor to determine at least one aberration matrix for each region of the image sensor.

Alternatively, or in addition, step 406 can be repeated several times for different lens-to-image sensor distances, denoted $LSD_j$, to determine at least one aberration matrix for each $LSD_j$ distance.

Alternatively, or in addition, step 406 can be repeated several times for different object distances, denoted $OD_k$, to determine at least one aberration matrix for each $OD_k$ distance.

In the example described, it is assumed that the step of determining an aberration matrix is carried out for each combination $\{R_i, LSD_j, OD_k\}$. Considering that there are I different regions, J different LSD distances and K different OD distances, step 406 is therefore repeated I×J×K times, resulting in the determination of as many outlier matrices, denoted $MA_{ijk}$.

Each aberration matrix $MA_{ijk}$ comprises values representative of the optical aberrations introduced, in a captured image, by this region $R_i$ of the optical lens for this distance $LSD_j$ between the optical lens and the image sensor, and for this distance $OD_k$ between the optical lens and the scene.

Steps 404 and 406 can be performed using simulation software. An example of such simulation software is OpticStudio® from Zemax®. Of course, the invention is not limited to this software, and other tools can also be used.

In some embodiments, all the aberration matrices are stored and the method 400 is terminated.

According to some embodiments, the method 400 may comprise an optional step 408, for calculating a matrix, called aberration kernel matrix, denoted AKM, comprising coefficients for deducing each aberration matrix, from said aberration kernel matrix.

Such an aberration kernel matrix can be calculated, as described above.

In this way, the aberration kernel matrix eliminates the need to memorize all the aberration matrices.

According to some embodiments, the method 400 may comprise an optional step 410, to calculate a matrix, called correction matrix, for each aberration matrix. The correction matrix may comprise the values used to correct an image.

For each aberration matrix $MA_{ijk}$, the correction matrix $MC_{ijk}$, can be determined.

According to exemplary embodiments, at least one correction matrix can be obtained by the relationship:

$$MC_{ijk} = TF^{-1}\left\{\frac{TF\{G_0\}}{TF\{MA_{ijk}\}}\right\}$$

where $G_0$ is a function representing the form of the point dispersion function to be obtained after correction. It can be a function approaching a Dirac function in two dimensions, i.e. 1 at the center, and almost 0 around it. Using $MTOBS_{ijk}$ to refer to the matrix of the test light beam as observed, and MT its native form as it actually is when emitted, the correction matrix $MC_{ijk}$ may be as follows:

$$MC_{ijk} = TF^{-1}\left\{\frac{TF\{G_0\} \cdot TF\{MT_{ijk}\}}{TF\{MTOBS_{ijk}\}}\right\}$$

In simplified form, we can assume that TF(G0)=1, the constant function that returns 1 with zero phase at all frequencies, which is written:

$$MC_{ijk} = TF^{-1}\left\{\frac{TF\{MT_{ijk}\}}{TF\{MTOBS_{ijk}\}}\right\}$$

where:

TF( ) is the Fourier transform operator (in 2D)

$TF^{-1}$( ) is the inverse Fourier transform operator (in 2D)

$MC_{ijk}$ is the correction matrix for the $R_i$ region of the image sensor, at lens-to-sensor distance $LSD_i$ and object distance $OD_j$;

$MA_{ijk}$ is the aberration matrix obtained by simulation for the region $R_i$ of the image sensor and the distances $LSD_i$ and $OD_j$; and $MT_{ijk}$ is the test light beam matrix, i.e. the matrix describing the test light beam, used to measure the aberration matrix $MA_{ijk}$ by simulation.

$MTOBS_{ijk}$ is the observed illumination matrix, obtained by simulation, in the sensor plane with respect to the test matrix $MT_{ijk}$ presented at the lens input.

In one embodiment, all correction matrices $MC_{ijk}$ can be stored in memory for later use in correcting an image.

Alternatively, the method 400 may comprise an optional step 412 for calculating a matrix, called correction kernel matrix (CKM), comprising coefficients enabling each correction matrix to be deduced from the correction kernel matrix. Such a correction kernel matrix CKM can be calculated in the same way as the aberration kernel matrix, using the same function basis $FA_f$ or another function basis.

Each aberration matrix $MA_{ijk}$ can be a matrix indicating:

a Point Spread Function (PSF), and an Optical Transfer Function (OTF);

in response to a test light beam. The determination of such a matrix is well known to those skilled in the art, and can be carried out by digital simulators such as Optic Studio® from Zemax®.

In summary, a test light beam is emitted on a region presented in front of the optical lens. The test light beam enters the optical lens, passes through it, and is received on an image sensor. The radiation values received are compared with the input values, i.e. the values of the test light beam. This comparison allows us to deduce the aberrations introduced by the optical lens for each region.

FIG. 5a is a schematic representation of a non-limiting exemplary embodiment of an image acquisition method according to the invention.

The method 500 of FIG. 5a can be implemented in any type of image acquisition apparatus using an optical lens associated with a photosensitive sensor, and in particular the lens 200 of FIG. 2. The light-sensitive sensor can be any type of sensor, such as a CCD or CMOS sensor.

The apparatus can be any type of apparatus such as an imaging module, a smartphone, a tablet, a computer, a surveillance camera, etc.

The method 500 includes a step 502 of image acquisition by the apparatus using the optical lens and sensor. The acquired image is in the form of a matrix of values, supplied by the sensor and denoted $IM_a$. The matrix $IM_a$ comprises numerical values for each sensor pixel. For example, for an RGB image, the matrix $IM_a$ contains three values for each pixel, one for each color.

The acquired image, and therefore the matrix $IM_a$, includes optical aberrations introduced by the optical lens, such as optical blurring or displacement. It can be corrected, in whole or in part, by correcting the values of the matrix $IM_a$ for at least some pixels. Image correction can be performed using at least one correction matrix deduced from at least one previously determined aberration matrix for the optical lens.

Image correction can be achieved using a single correction matrix, denoted MC, for the entire lens. Alternatively, image correction can be carried out using several correction matrices $MC_i$, each for a region $R_i$ of the image sensor, and therefore for a part of the image. In the following, without loss of generality, we consider that a plurality of correction matrices $MC_i$ are used, each to correct the aberrations introduced by a region $R_i$ of the sensor.

In the method 500 shown in FIG. 5a, the correction matrices are calculated in advance and stored in a memory area of the device acquiring the image. In particular, each correction matrix can be determined during a characterization of the optical lens, as described with reference to the method 400 of FIG. 4, in particular step 410 of the method 400.

In this case, the method 500 comprises a step 504 of reading each correction matrix $MC_i$ from the memory area of the apparatus.

Then, in a step 506, the captured image is corrected using the respective correction matrix $MC_i$.

For example, denoting as $IM_c$ the matrix of values representing the corrected image, the image correction can be obtained by convolving the matrix $IM_a$ by each correction matrix $MC_i$ for the pixels concerned by the region $R_i$, in turn or at the same time:

$$IM_c = conv(IM_a, MC_i) \text{ where } i = 1, \ldots, I \text{ and } I \geq 1$$

FIG. 5b is a schematic representation of another non-limiting exemplary embodiment of an image acquisition method according to the invention.

The method 510 of FIG. 5b comprises the steps 502 of acquiring an image and the steps 506 of correcting the image with one or more correction matrices.

Unlike the method 500, in the method 510 each correction matrix $MC_i$ is not previously determined and stored in a memory area of the device.

The method 510 comprises a step 512 of calculating each correction matrix:

from a correction kernel matrix, from at least one predetermined aberration matrix, or from an aberration kernel matrix.

as described with reference to FIG. 4.

In the method 510, optionally, each correction matrix can be stored in the device to be reused for the correction of at least one other image. In this case, the steps 502 and 506 can be repeated several times using each correction matrix calculated in step 512, without having to perform step 512 on each iteration.

Step 512 can be performed:

when integrating the optical lens into the apparatus, when configuring the apparatus, when installing a photo application in the apparatus, when the photo application is started, or during image acquisition.

In the example shown in FIG. 5b, the step 512 of calculating each correction matrix is performed before the image acquisition step. Of course, according to other examples not shown, the step 512 of calculating each correction matrix can be performed during the image acquisition step 502, or after the image acquisition step 502, or at any time before the correction step 506.

Figure 5C:
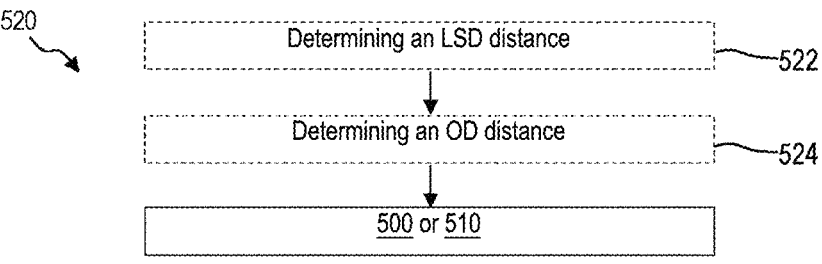

FIG. 5c is a schematic representation of another non-limiting exemplary embodiment of an image acquisition method according to the invention.

The method 520 of FIG. 5c may comprise an optional step 522 of determining a distance, denoted LSD, between the optical lens and the photosensitive sensor. The LSD distance can, for example, be measured by a distance sensor, such as an optical sensor, a magnetic sensor, a capacitive sensor, etc. The LSD distance can, for example, be calculated from information provided by an optical focusing mechanism modifying/adjusting the distance between the optical lens and the image sensor.

Alternatively, or additionally, the method 520 of FIG. 5c may comprise a step 524 for determining a distance, denoted OD, between the optical lens and the scene. The OD distance can, for example, be measured by LIDAR, a time-of-flight camera, an ultrasonic sensor, etc. The OD distance can be measured for different regions $R_i$ of the image sensor. Alternatively, a single OD distance can be measured for the entire lens.

Next, steps 500 or 510 of the method can be performed to correct the image. The correction matrix(es) used to correct the image can be selected in step 504, or calculated in step 512, depending on the LSD and/or OD distances determined in steps 522 and/or 524.

In this way, the acquired image is corrected by taking into account the LSD distance and/or the OD distance, at the time of image acquisition, enabling improved image correction.

The method 520 thus enables on-the-fly correction of an image, taking into account the precise conditions under which the image was taken.

Figure 6:
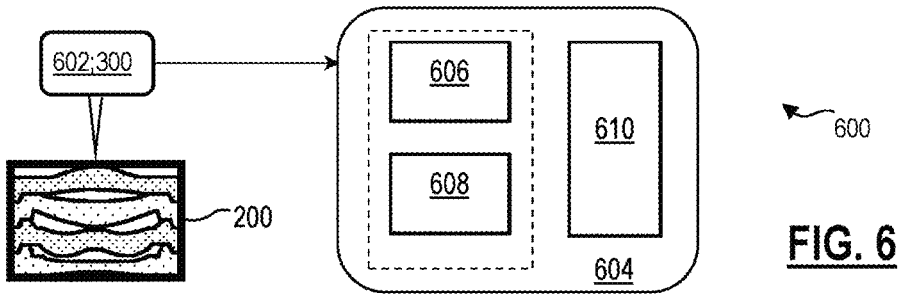
FIG. 6 is a schematic representation of a non-limiting exemplary embodiment of a system according to the invention for characterizing an optical lens.

FIG. 6 is a schematic representation of a non-limiting exemplary embodiment of a system according to the invention for characterizing an optical lens.

The system 600 of FIG. 6 can be used to characterize any type of optical lens used for acquiring images, and in particular the lens 200 of FIG. 2.

The system 600 of FIG. 6 can be used to implement a method according to the invention for characterizing an optical lens, and in particular the method 400 of FIG. 4.

The system 600 comprises a device 602 for optically measuring at least one geometric set, noted JG, comprising data relating to at least one geometric parameter of at least one optical interface of an optical lens, such as for example the lens 200 of FIG. 2. The device 602 may be the interferometer 300 of FIG. 3. Alternatively, the device 602 can be a confocal measurement device configured to measure the geometric set JG.

The system 600 further comprises a calculation unit 604 configured to:
- numerically model the optical lens as a function of the geometric set JG provided by the optical measuring device 602; and
- determine, by optical wave propagation simulation applied to said digital model of the optical lens, at least one aberration matrix, representative of optical aberrations introduced by said optical lens into an image.

The calculation unit 604 can run a modeling interface 606 taking as input the geometric set JG and an optical wave propagation digital simulator 608 to measure the at least one aberration matrix. In some embodiments, the modeling interface 606 and the digital simulator can be integrated into a single digital tool, in particular software, such as Optic-Studio from Zemax.

The calculation unit 604 can optionally include a calculation module 610 configured to calculate:
- at least one aberration kernel matrix,
- at least one correction matrix, or
- at least one correction kernel matrix;
from the at least one aberration matrix determined by the digital simulator 608. The computing module 610 can be a physical module such as a processor, chip or computer, or a software module such as a computer program or software application.

The computing unit 604 may take the form of a hardware device, such as a computer or server. Alternatively, the calculation unit 604 can be in software form, such as one or more computer programs. Alternatively, the computing unit 604 can be formed by any combination of at least one hardware means and at least one software means.

Figure 7:
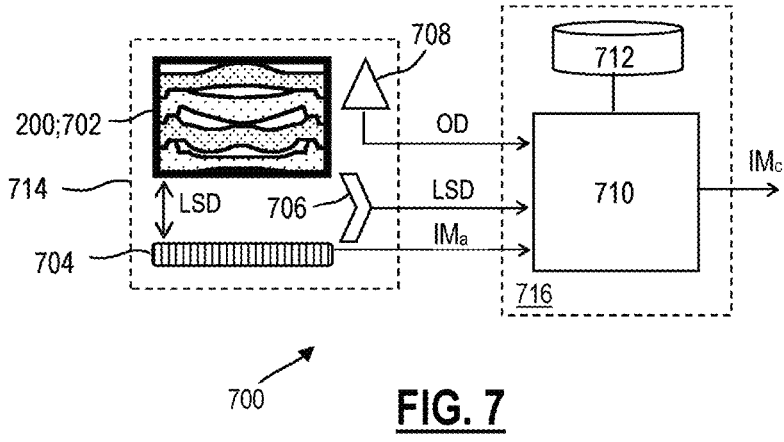
FIG. 7 is a schematic representation of a non-limiting exemplary embodiment of an image acquisition device according to the invention.

FIG. 7 is a schematic representation of a non-limiting exemplary embodiment of an image acquisition device according to the invention.

The device 700 of FIG. 7 may be used to implement a method for acquiring an image according to the invention, and in particular any one of the methods 500, 510 or 520 from FIGS. 5a, 5b, and 5c.

The device 700 comprises an optical lens 702, which may be, for example, the optical lens 200 shown in FIG. 2.

The device 700 further comprises a photosensitive sensor 704, cooperating with the optical lens 702 to take an image of a scene. The image sensor 704 is designed to provide a matrix of values, denoted $IM_a$, representing the acquired image of the scene.

Optionally, the device 700 may comprise a sensor 706 designed to measure the LSD distance between the optical lens and the image sensor 704. Such a sensor 706 can be a capacitive sensor, a resistive sensor, or an image sensor. This sensor 706 provides a distance value, or a value of an electrical quantity representative of the LSD distance, such as a voltage, a current, etc.

Optionally, the device 700 may comprise a sensor 708 designed to measure the OD distance between the optical lens and the imaged scene.

Such a sensor 708 may be a LIDAR sensor, for example. This sensor 708 provides a distance value, or a value of an electrical quantity representative of this OD distance, such as a voltage, a current, etc.

The device 700 further comprises a calculation unit 710 configured to correct the image captured by the sensor 704, and in particular the matrix $IM_a$, and provide a matrix, denoted $IM_c$, representing the corrected image, based on at least one correction matrix.

The computing unit 710 can be a hardware unit such as a processor or a computer chip. Alternatively, the computing unit can be a computer program or application.

In one embodiment, for example described with reference to FIG. 5a, the at least one correction matrix can be read from a memory area, or database, 712. In this case, the calculation unit 710 reads said at least one correction matrix, optionally the at least one matrix associated with the LSD and/or OD distances measured during image capture.

According to an embodiment, for example described with reference to FIG. 5b, the calculation unit 710 can be further configured to calculate the at least one correction matrix, based on:
- a correction kernel matrix.
- at least one predetermined aberration matrix, or
- an aberration kernel matrix;
stored in the database 712. In this case, the calculation unit reads said at least one matrix and calculates the at least one correction matrix from said at least one matrix that was read, and optionally from the LSD and OD distances.

The optical lens 702, sensor 704, and optionally sensors 706 and 708 form an imaging module, also called camera module 714. The camera module 714 may comprise components other than those shown, such as a focus adjustment mechanism (not shown) that modifies the distance between the image sensor 704 and the optical lens 702.

The calculation unit 710, and optionally the database 712, can be integrated into a photo application, 716, installed or executed within an apparatus such as a smartphone, tablet, computer, etc.

Figure 8:
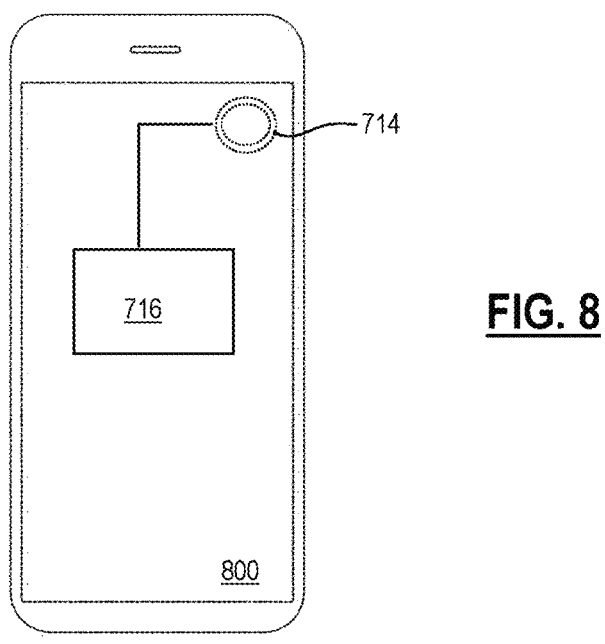
FIG. 8 is a schematic representation of a non-limiting exemplary embodiment of an image acquisition device according to the invention.

FIG. 8 is a schematic representation of a non-limiting exemplary embodiment of an image acquisition apparatus according to the invention.

The apparatus 800 comprises a device according to the invention for acquiring an image, and in particular the device 700 of FIG. 7.

According to embodiments, the apparatus 800 can be a still camera, a tablet or smartphone, a computer, a surveillance camera or a camera module for integration into another device, etc.

In the example shown, the apparatus 800 is a smartphone comprising a front-facing display screen and the optical module 714 opening onto its rear face, a photo application 716 integrating the calculation module and the database 712.

Of course, the invention is not limited to the examples disclosed above.

The invention claimed is:

1. A method for characterizing an optical lens comprising a stack of a plurality of optical elements and intended to be associated with an image sensor for acquiring images, said method comprising the following steps:

determining, by optical measurement on said stack of optical elements, at least one data set (JG), called geometric set, comprising data relating to at least one geometric parameter of at least one buried optical interface ($214_2$-$214_8$) of said lens;

digitally modeling said optical lens as a function of said geometric set (JG); and determining, by an optical wave propagation digital simulator applied to said digital model, at least one matrix, called aberration matrix, representative of optical aberrations introduced by said optical lens into an image.

2. The method according to claim 1, characterized in that it comprises a determination of several aberration matrices for several regions of the image sensor.

3. The method according to claim 1, characterized in that it comprises a determination of a plurality of aberration matrices for a plurality of values of a distance, called lens-to-sensor distance, LSD, between said optical lens and an image plane, the digital simulator taking said lens-to-sensor distance as its input.

4. The method according to claim 1, characterized in that it comprises determining a plurality of aberration matrices for a plurality of values of a distance, called the object distance, OD, between said optical lens and a scene, the digital simulator taking said object distance as input.

5. The method according to claim 1, characterized in that it comprises a step of calculating a matrix, called aberration kernel matrix, comprising coefficients enabling at least one aberration matrix to be deduced.

6. The method according to claim 1, characterized in that it further comprises a step of calculating, as a function of at least one aberration matrix, at least one matrix, called correction matrix, comprising values for correcting an image captured with said optical lens.

7. The method according to claim 1, characterized in that at least one aberration matrix is:

a matrix, called PSF matrix, of Point Spread Function (PSF) values, and/or a matrix, called OTF matrix, of Optical Transfer Function (OTF) values.

8. The method according to claim 1, characterized in that at least one geometric set (JG) is obtained by optical interferometry, or by confocal measurement(s).

9. A method for acquiring an image with an apparatus comprising an optical lens and an image sensor, said method comprising the following steps:

capturing an image with said optical lens and said image sensor; and correcting said image as a function of at least one correction matrix calculated from at least one aberration matrix obtained, for said optical lens, by the method for characterizing an optical lens according to claim 1.

10. The method according to claim 9, characterized in that it comprises a step of calculating at least one correction matrix within said apparatus.

11. The method according to claim 9, characterized in that it further comprises a step of determining a distance, LSD, between the optical lens and an image plane, the correction taking said LSD distance into account.

12. The method according to claim 10, characterized in that it further comprises a step of determining a distance, OD, between the optical lens and a scene, the correction taking said OD distance into account.

13. An image acquisition device comprising:

an optical lens comprising a stack of several optical elements, an image sensor; and a calculation unit;

configured to implement the method according to claim 9.

14. An image acquisition apparatus, such as a camera, tablet or smartphone, comprising an image acquisition device according to claim 13.

15. A system for characterizing an optical lens including a stack of a plurality of optical elements and intended to be associated with an image sensor for acquiring images, said system comprising:

a device for optical measurement, on said stack of optical elements, at least one data set (JG), called geometric set, comprising data relating to at least one geometric parameter of at least one buried optical interface of said lens;

at least one calculation unit configured for:

digitally modeling said optical lens based on the geometric set (JG); and determining, by an optical wave propagation digital simulation applied to said digital model, at least one matrix, called aberration matrix, representative of optical aberrations introduced by said optical lens into an image.

* * * * *